United States Patent [19]
Ogden

[11] Patent Number: 5,332,591
[45] Date of Patent: Jul. 26, 1994

[54] METHOD AND APPARATUS FOR MAKING INSTANT COFFEE

[76] Inventor: Ralph Ogden, 8803 Parkway Dr., Highland, Ind. 46322

[21] Appl. No.: 941,810

[22] Filed: Sep. 8, 1992

[51] Int. Cl.[5] .............................................. A23F 5/26
[52] U.S. Cl. .................................. 426/386; 426/432; 426/433
[58] Field of Search ............... 426/427, 428, 431, 432, 426/433, 466, 467, 386

[56] References Cited

U.S. PATENT DOCUMENTS

| | | | |
|---|---|---|---|
| 2,863,774 | 12/1958 | Bonotto | 426/432 |
| 3,035,922 | 5/1962 | Mook et al. | 426/432 |
| 3,148,070 | 9/1964 | Mishkin et al. | 426/386 |
| 4,606,921 | 8/1986 | Liu | 426/432 |

*Primary Examiner*—Caleb Weston
*Attorney, Agent, or Firm*—Patula & Assoc.

[57] ABSTRACT

A method and apparatus for producing flavorful instant coffee. The method includes the conventional steps of grinding and roasting the coffee beans. Also included are a step of collecting the aromatic compounds driven off during roasting and adding these aromatics to the water soluble coffee components prior to packaging.

8 Claims, 1 Drawing Sheet

METHOD AND APPARATUS FOR MAKING INSTANT COFFEE

FIELD OF THE INVENTION

This invention relates to an apparatus for making coffee and will have application to a method of making flavorful instant coffee.

BACKGROUND OF THE INVENTION

Coffee producers have endeavored for years to produce an instant coffee whose taste could compare favorably with the taste of coffee brewed from quality roast and ground coffee beans. Despite numerous advertising campaigns to promote various brands of instant coffees, there is still no instant coffee on the market which can compare tastewise with coffee brewed fresh from quality roast and ground coffee beans.

The main reason for the difference in taste between fresh brewed coffee and instant coffee is the presence of aromatic compounds in the former. Instant coffees are as a rule less flavorful than ground roast coffees because the processes used to produce the instants nearly always drive off the volatilized aromatics.

Coffee aromatics are not found in nature. They are a product of the destructive distillation occurring in the roasting process. The quantity of aromatics produced is greater when high quality green coffee beans are roasted. Arabica coffee beans are usually an example of high quality coffee beans. At most, the aromatics are present in the roast beans to about 450 parts per million. It is difficult to retain the aromatics in the roasted coffee for other than a short time unless conditions are introduced into the processing and packaging operations which favor their extended longevity.

SUMMARY OF THE INVENTION

The process and apparatus of this invention are designed to retain the aromatic compounds in the finished coffee product. Since the human sense of smell is an integral part of how we perceive taste, the retention of these aromatic compounds provides a more flavorful instant coffee product than was previously considered possible.

The process involves the steps of grinding the green coffee beans, removing the oil and moisture from the ground coffee, then roasting the ground coffee and extracting the water soluble compounds from the aromatics free grounds. The aromatics generated and driven off during roasting are collected and introduced into the non aromatic water solubles just prior to packaging. The ground green coffee beans, after roasting, collecting the aromatics and extracting the non aromatic water solubles, are discarded.

By collecting and introducing the generated aromatics into the non aromatic water soluble compounds of the ground and roasted coffee beans, a good smelling and flavorful instant coffee is produced. The apparatus utilizes a combination of heaters, coolers, collection units and storage tanks in connection with the coffee roaster to collect the aromatics generated during roasting.

Accordingly, it is an object of this invention to provide for a process of making aromatic enhanced instant coffee which mimics the full flavor of fresh brew coffee from roast and ground coffee beans.

Another object is to provide an apparatus for making flavorful instant coffee.

Another object is to provide a process and apparatus to make instant coffee wherein the process is easy to implement and wherein the apparatus is efficient and economical to operate and maintain.

Other objects will become apparent upon a reading of the following description.

BRIEF DESCRIPTION OF THE DRAWINGS

A preferred apparatus has been depicted for illustrative purposes only wherein.

DESCRIPTION OF THE PREFERRED EMBODIMENT

Figure 1:
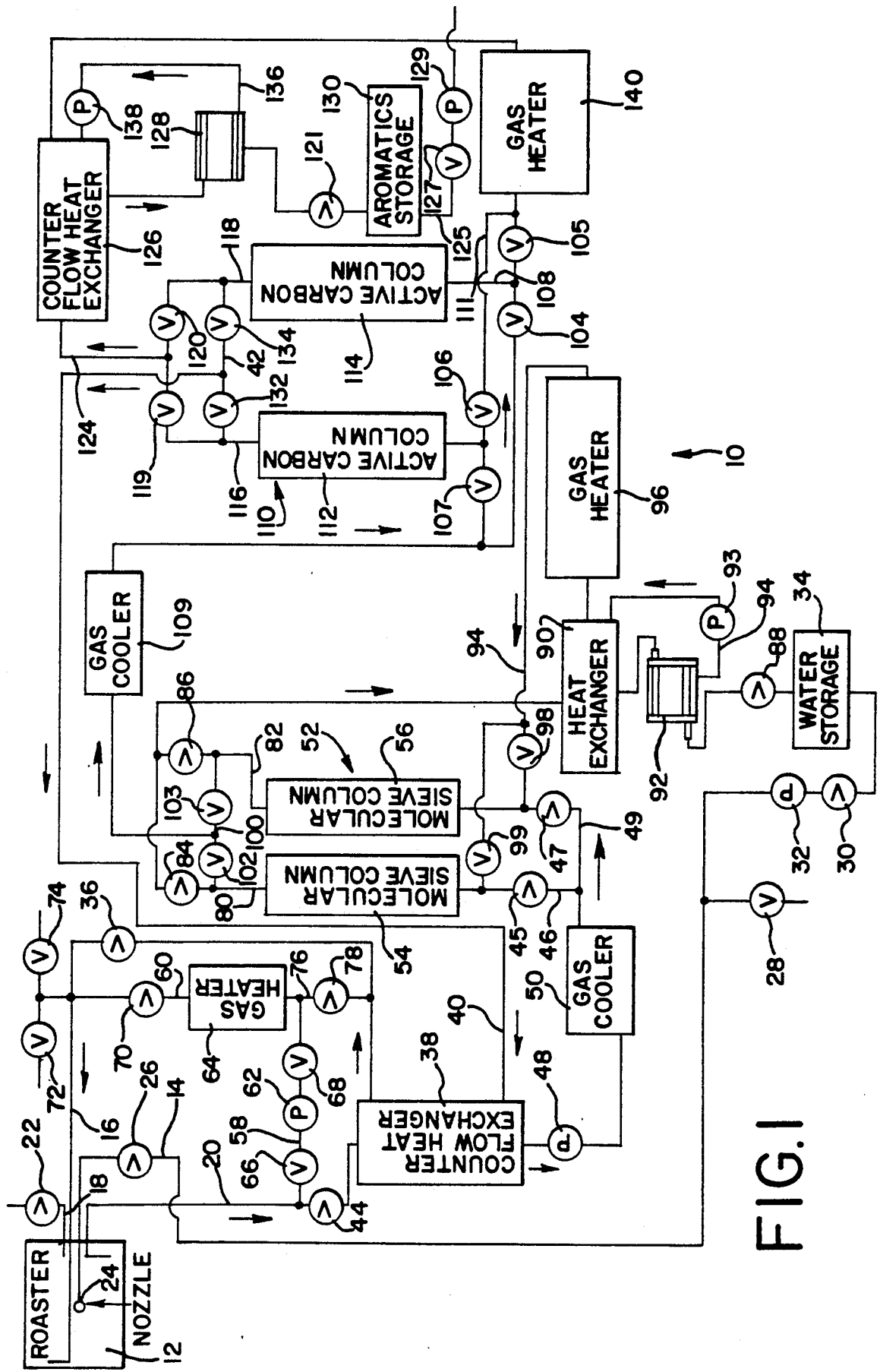
FIG. 1 is a schematical representation of the apparatus for roasting the ground coffee, and collecting and introducing the aromatic compounds generated during roasting into the non aromatic water solubles.

The preferred embodiment herein described is not intended to be exhaustive or to limit the invention to the precise form disclosed. It has been chosen and described to explain the principles of the invention and its application and practical use so as to allow others skilled in the art to understand the teachings of the process and of the apparatus.

The process of this invention will be described to include all of the steps used in producing instant coffee from fresh green coffee beans. Preferably, a type of coffee bean is used which will generate a quantity of aromatic compounds during roasting so as to produce a good-smelling and flavorful coffee product. The preferred bean for use is an arabica bean, but the process can be used and adapted to encompass any coffee beans which produce aromatic compounds during roasting.

The first step of the process involves grinding the coffee beans. Preferably the beans are coarsely ground by a conventional grinding process.

Next, the coffee oil is removed from the ground beans by any of a number of conventional methods. These methods include solvent extraction by liquid carbon dioxide, liquid propane under pressure, hexane, freon, super critical carbon dioxide gas, and others. For purposes of this invention, it is necessary to remove as much of the coffee oil (green coffee beans usually contain about 10–15% coffee oil by weight) as possible.

The solvent used in the de-oiling process is then removed from the ground coffee along with the coffee oil. This process is well-known and will not be described further in the interests of clarity. The coffee oil is collected and stored after the de-oiling solvent is removed. This allows the caffeine which was dissolved in the solvent to precipitate and be added back to the ground coffee after roasting it, if desired. The coffee oil can be sold as an edible oil, if desired, after solvent removal.

Next, the ground, de-oiled coffee beans are preferably heated to about 300° F. to remove the moisture (about 10%–15% by weight) from the beans. The preferred temperature must be well below the roasting temperature (about 375° F.–400° F.) in order to prevent premature bean roasting. Absolute dryness of the beans is not required as moisture, as well as $CO_2$ are roasting by-products, but it is preferred to remove a large quantity of the moisture prior to roasting. The beans may be dried under reduced pressure conditions to decrease drying time.

Next, the ground, de-oiled, moisture free beans are roasted and the volatile aromatics generated are collected for later introduction into the non aromatic water solubles. This step of the method is more easily followed by reference to FIG. 1 which schematically depicts the apparatus 10 used to roast the coffee and to collect and reintroduce the generated aromatic compounds which greatly enhance coffee flavor and smell.

The steps of this process are more easily followed by referring to FIG. 1 which schematically depicts the apparatus 10 used to roast the coffee and to collect the generated aromatic compounds which greatly enhance coffee flavor and smell. Apparatus 10 includes a roaster 12 which is depicted schematically in FIG. 1. Roaster 12 is preferably of a design similar to a conventional coffee roaster. It is connected to a heating apparatus (not shown) for bringing the ground green coffee beans up to roasting temperature. Roasting begins at 375° F.–400° F. and continues up to 500° F. and above. Roaster 12 is usually a rotating drum which includes inlet conduits 14, 16 and outlet conduits 18, 20. Outlet conduit 18 is connected in flow communication to pressure relief valve 22.

Inlet conduit 14 may terminate in a spray nozzle 24 inside roaster 12 and is connected through valves 26, 30 and pump 32 to water storage tank 34. Drain valve 28 is located along inlet conduit 14 as shown.

Inlet conduit 16 is connected through valve 36 to a heat exchanger 38 and by conduit 40 to branch conduit 42 as shown.

Outlet conduit 20 is connected through valves 44, 45, 47, heat exchanger 38, conduits 46, 49, pump 48 and gas cooling unit 50 to a water removal unit 52, shown as molecular sieves 54, 56. Branch conduit 58 connects outlet conduit 20 with a venting conduit 60 through gas pump 62, heater 64 and valves 66, 68, 70, 72. Branch conduit 76 and valve 78 connect vent conduit 60 to inlet conduit 16 as shown.

Conduits 80, 82 connect molecular sieves 54, 56 to water storage tank 34. Valves 84, 86, 88, heat exchanger 90 and condenser 92 are positioned along conduits 80, 82 as shown. Conduit 94 terminates in condenser 92 and runs through pump 93 heat exchanger 90 and heater 96 into conduits 46, 49. Valves 98, 99 is positioned along conduit 94 as shown.

Branch conduit 100 is connected between conduits 80, 82 and is connected through valves 102, 103, 104, 105, 106, 107, conduits 108, 111, and cooler 109 to an aromatic collection unit, generally designated by numeral 110. In the embodiment shown, aromatic collection unit 110 includes a pair of parallel connected activated carbon beds 112, 114.

Carbon beds 112, 114 are connected by conduits 116, 118, valves 119, 120, 121, conduit 124, heat exchanger 126 and condenser 128 to an aromatic storage tank 130. Branch conduit 42 and valves 132, 134 allow selective flow communication between carbon beds 112, 114 and inlet conduit 16.

Conduit 136 which terminates in condenser 128 and extends through pump 138, heat exchanger 126 and heater 140 is connected to conduit 108 as shown.

Apparatus 10 is utilized in the roasting step of the process and serves to roast the coffee beans, remove residual moisture from the beans and to collect the aromatic compounds generated during roasting.

After the ground coffee beans are placed in roaster 12, the roaster is sealed and heat introduced to the outer side wall of the roaster by an accepted method. Heating may be accomplished by means of inert gas heat, microwave or flame heat as desired. Preferably, apparatus 10 is purged prior to roasting by closing valves 44, 74 and 78, opening valve 72 and pulling a vacuum through conduits 20, 58 and 60. When a suitable vacuum has been reached, valve 72 is closed and inert gas in introduced through valve 74. This operation may be repeated more than once, if necessary to provide a low enough level of oxygen in the apparatus. When purging is completed, apparatus 10 is ready to begin the roasting and collecting process.

The roasting process will be described under normal operational conditions in order to avoid unnecessary details being included here. Prior to roasting, valves 66, 68 are opened and pump 62 and heater 64 are switched on to introduce inert carried gas into roaster 12. As roasting begins (when the temperature reaches between 375° F.–400° F.) valves 66, 68 are closed and pump 62 is switched off. Pump 48 is switched on and valves 44, 78 are opened along with valves 45, 102, and 107. Coolers 50 and 109 are activated during this cycle.

Under the influence of pump 62, gases are drawn out of roaster 12 through outlet conduit 20, valve 44, heat exchanger 38, cooler 50 and valve 45 into molecular sieve 54. The residual moisture is removed from the gas stream in molecular sieve 54, with the remaining aromatics and inert gas passing through the sieve, through valves 102, 107 and cooler 109 into activated carbon bed 112. The carbon bed 112 adsorbs the aromatic compounds in the gas stream, while the inert gas passes through valves 132, 78 and 70 and heat exchanger 38 and heater 64 back into roaster 12. This cyclic process is carried on throughout the roasting phase of the ground coffee beans.

It should be noted here that the opening and closing of all valves, 10 may be accomplished automatically by power operations appropriately sequenced by a programmed electronic device, such as a microprocessor based programmable controller (not shown) or other similar device to facilitate operations. Sensing devices to monitor temperatures, pressures and bean color may also be incorporated into the controller(s) to ensure efficient operation of apparatus 10.

When roasting is completed (usually indicated by visual inspection of the bean color) all valves are closed with the exception of valves 30 and 26 which are opened. Water pump 32 is switched on to deliver water to roaster 12. This lowers the temperature of the roaster 12 to halt roasting. Alternatively, liquid $CO_2$ may be introduced into roaster 12 as through nozzle 24 to stop the roasting process. Roaster 12 is then unloaded, whereupon the above process is repeated for the next batch of coffee beans.

It should be noted that the above roasting process was described as utilizing only a single sieve 54 and carbon bed 112. In reality, either or both sieves 54, 56 and beds 112, 114 may be utilized to remove moisture and aromatics from the gas stream if desired.

Molecular sieves 54, 56 have a limited capacity and as such must be regenerated from time to time in order to ensure efficient moisture removal. To regenerate sieve 56, pump 93 and heater 96 are switched on and valves 98, 86 and 88 are opened. All other valves are closed. Inert gas will thus pass through conduit 94, heat exchanger 90, heater 96 and valve 98 through sieve 56 to drive moisture out of the sieve due to the gas heat. The moisture laden gas stream then travels along conduit 82, through valve 86 and heat exchanger 90 into condenser 92. Here the gas stream is cooled to condense the moisture which flows through valve 88 into water storage tank 34. This process is continued until substantially all of the moisture is driven off of sieve 56. The same process is followed to regenerate sieve 54, but with valves 99, 84 opened instead of valves 98, 86.

Likewise, carbon beds 112, 114 must be regenerated from time to time to collect the adsorbed aromatic compound for storage and introduction of the aromatics into the non aromatic water solubles prior to packaging. To regenerate carbon bed 114, pump 138 and heater 140 are switched on and valves 105, 120, and 121, are opened. All other valves are closed. Inert gas travels along conduit 136 through heat exchanger 126, heater 140 and valve 105 into carbon bed 114 where, due to heat, the gas drives the aromatics off the activated carbon. The gas stream and aromatics then pass through valve 120 into conduit 124 and through heat exchanger 126 into condenser 128. Aromatics are condensed into liquid form in condenser 128 and pass through valve 121 into aromatic storage tank 130.

Regeneration of sieves 54, 56 and carbon beds 112, 114 may be accomplished with less or no heat generation by connecting a vacuum pump to the bed or sieve to be regenerated. Conduit 125 connects storage tank 130 to a packaging operations (not shown) through valve 127 and pump 129.

The next step of the process involves the extraction and concentration of the water soluble solids from the ground roast coffee. There are several well-known methods to accomplish this feature.

The process for preparing a concentrated aqueous solution of coffee water solubles for making instant coffee is well known in the industry and is usually referred to as percolation. It allows preparation of a strong coffee solution that has a minimum of 30% solids by weight. This solution can be further concentrated to complete dryness or precisely to any concentration of solids in between by conventional methods. The concentration selected will depend upon the requirements of the particular type of packaging of the instant coffee. Alternatively, the coffee solution may be dried completely and oxygen free water added to the extent necessary for packaging.

The next step of the process involves the introduction of the aromatic compounds into the non aromatic water soluble components. The manner of introduction of the aromatics will depend upon the form which the finished product will take. It is important that this reintroduction and packaging is effected in an oxygen-free environment to prevent premature escape and/or degradation of the aromatics.

This invention envisions at least four possible forms of packaging: powder; paste; and aqueous solution. In all forms, the reintroduction of the aromatics involves the collecting of aromatic storage tank 130, and the connection of the tank to an injecting apparatus (not shown). The aromatic compounds contained in tank 130 are introduced into the non aromatic water soluble mixture just prior to packaging in an inert gas environment to ensure freshness and prevent their degradation. Although it is expected that the aromatics and non aromatic water solubles will be normally mixed and packaged to give the approximate same ratio of aromatics to non aromatic water solubles that they would have had if the beans had been roast and ground in the conventional manner, it is not necessary that this be so. It is possible to use the aromatics in higher quantity in instant coffee that will be sold at a premium price and to use a lesser amount in an instant coffee to be sold at a lower price. It is possible and practical to roast the coffee beans in the country where it is grown, bulk packaging the aromatics and the non aromatic water solubles and then ship quantities of each to processors for final packaging in other locations, most of them in other countries.

Further, it might be advantageous to mix the aromatics with non aromatic water solubles processed from a different kind of coffee beans than that from which the aromatics were generated. Any caffeine collected during the oil extraction step can be introduced at this packaging step, if "regular" coffee is desired. This process of producing aromatic instant coffee thus gives processors of instant coffee the flexibility to manipulate the relative amounts of each ingredient to suit the tastes of individual segments of their market.

The form of packaging is also conventional and is normally dependent upon the form of the finished coffee product. In the case of powders and crystals, the packaging will normally be a vacuum-sealed container or in the case of individual servings foil leaves sealed at their outer edges. In the case of paste, the packaging would resemble a tube of toothpaste, and a aqueous solution would preferably be packaged in a container having an internal sealed separator above the liquid level. Concentrate would be dispensed by pressing down on the separator. All of these types of packaging are well-known and conventional.

The above described process and apparatus are capable of producing instant coffee which is as flavorful as if brewed fresh from coffee beans which are ground and roasted in a conventional manner coffee. Although specific steps and a specific apparatus for roasting the coffee and collecting the aromatics has been described in detail, the invention herein should not be construed as limited to the precise steps or arrangement of parts described. The scope of the invention is defined by the following claims.

I claim:

1. A method of making instant coffee comprising the steps of:
   a) providing a quantity of coffee beans;
   b) grinding said coffee beans;
   c) removing moisture from said ground coffee beans;
   d) roasting said ground coffee beans in the absence of oxygen and collecting aromatic compounds generated during roasting;
   e) extracting and collecting water soluble compounds from said ground roast coffee beans;
   f) mixing said water soluble compounds and said aromatic compounds to form instant coffee; and
   g) packaging said instant coffee in an oxygen free environment.

2. The method of claim 1 wherein step (c) also includes removing coffee oils from said ground coffee beans.

3. The method of claim 2 wherein step (c) includes extracting caffeine from said coffee oils, and step (f) includes mixing said caffeine with said water soluble compounds and said aromatic compounds.

4. The method of claim 1 wherein step (a) includes providing green arabica coffee beans.

5. The method of claim 2 wherein step (c) includes removing said coffee oils with a solvent, then heating said ground coffee beans to a temperature below roasting temperature to remove said moisture.

6. The method of claim 1 wherein step (d) includes collecting said aromatic compounds by an adsorptive activated carbon bed connected in flow communication with a roaster.

7. The method of claim 6 and further including a means for regenerating said carbon bed to drive off adsorbed aromatic compounds and transfer the aromatic compounds to a storage tank.

8. The method of claim 6 wherein step (d) includes roasting said ground coffee beans in the presence of an inert gas.

* * * * *